United States Patent [19]

Rossi

[11] 3,863,400
[45] Feb. 4, 1975

[54] DEVICE FOR CONTROLLING THE APPROACH SPEED IN MACHINE TOOLS PARTICULARLY GRINDING MACHINES

[75] Inventor: Roberto Rossi, Bologna, Italy

[73] Assignee: Finike Italiana Marposs-Soc. In Accomandita Semplice di Mario Possati & Co., Via Saliceto, Italy

[22] Filed: May 31, 1973

[21] Appl. No.: 365,733

[30] Foreign Application Priority Data
June 6, 1972 Italy.................................... 3451/72

[52] U.S. Cl............................. 51/165.77, 51/165.91
[51] Int. Cl............................................. B24b 49/02
[58] Field of Search......... 51/165 R, 165.77, 165.91

[56] References Cited
UNITED STATES PATENTS

| | | | |
|---|---|---|---|
| 3,597,888 | 8/1971 | Kusakabe......................... | 51/165.77 |
| 3,672,100 | 6/1972 | Pesante............................ | 51/165.77 |
| 3,775,910 | 12/1973 | Kubo................................ | 51/165.91 |

Primary Examiner—Harold D. Whitehead
Attorney, Agent, or Firm—Stevens, Davis, Miller & Mosher

[57] ABSTRACT

A device for controlling the approach speed of a grinder toward a piece to be machined which includes a unit containing a control group and a processing group for the continuous evaluation of size changes in time of pieces during a machining cycle and a commutation group operated by said unit to control the passage from approach speed to feed speed. The device may include a threshold circuit between the unit and the commutation group to avoid commutation as a result of mechanical or electrical oscillations. The device also may include a timing means associated with the unit to control its triggering which may be placed at the output of a second threshold circuit which receives signals from a gauging head adapted to measure the sizes of the pieces being machined.

6 Claims, 3 Drawing Figures

DEVICE FOR CONTROLLING THE APPROACH SPEED IN MACHINE TOOLS PARTICULARLY GRINDING MACHINES

The present invention relates to a device for controlling the approach speed in machine tools, and particularly a device for controlling stopping of the fast approach movement of a grinding wheel towards the piece to be machined.

When mechanical pieces are machined by grinders, the approach of the grinding wheel to the piece before the proper removal of material takes place is usually carried out with a fast movement, at a speed considerably higher than the feed rate of the tool during stock removal. This is done in order to reduce the duration of machining cycle, which results in an increase of the productivity of the machine. To optimize the cycle, it would be desirable to perform the commutation from fast approach movement into feed movement at the same amount in which the grinding wheel comes into contact with the piece.

This desirable goal is unattainable in that the distance, at the beginning of the cycle, of the surface of the piece from the grinding wheel is variable, for example owing to the change of the tool diameter and to the different thickness of the stock of the various pieces.

In some known devices the speed commutation is carried out on the basis of the power taken by the motor causing the wheelhead to advance. Commutation is performed when an increase in power higher than a pre-set limit is detected.

Such known devices, however, present some disadvantages which limit their field of application and also may cause defective pieces.

One disadvantage is that said motors are generally fed by mains frequency.

Since the absorbed power is evaluated by examining the electric quantities of the motor, it is clear that, to obtain exhausting information from electric low-frequency signals, it takes a certain time, often considerable with regard to practical requirements. Thus commutation is carried out with too long a delay after the contact between tool and piece.

Another delay is due to the fact that the motor absorption does not increase considerably just after said contact, but only when the pressure between grinding wheel and piece has reached rather high values and the piece has suffered flexions and strains which cannot always be recovered and corrected in the subsequent phases of machining.

As a result, the piece shape is uneven and the surface finishing is not satisfactory.

If the value of the piece stock before grinding is relatively small, it may happen that the whole machining cycle is carried out with the grinding wheel advancing towards the piece at approach speed. In other known devices speed commutation is carried out based on a comparison between the signals of two gauging heads, one of which detects the piece sizes and the other the displacement of the wheelhead.

These devices, too, present a number of disadvantages, one of which is that the wear of a grinding wheel can not be exactly evaluated, from gauge signals, so as to obtain an accurate distance between the surfaces of the piece and the grinding wheel.

In fact the gauge signals can give directly only information about the distance between the piece surface and the wheelhead.

Furthermore, the use of two gauging heads results in higher costs and the device requires a long and difficult setting up.

The technical problem that the present invention intends to solve is to provide a device for controlling the approach speed in machine tools, which is prompt, highly reliable, of limited cost, and allows reducing the duration of machining cycles without damaging the quality of piece finishing.

This problem is solved by a device for controlling the approach speed in machine tools including a known unit for the continuous evaluation of the changes of piece sizes during the machining cycle, timing means to put the unit into operation, and a threshold circuit associated with the same unit, said threshold circuit being connected with a commutation unit to switch over from approach speed to feed speed.

The present invention will be described more particularly with reference to the enclosed drawing, in which an embodiment given by way of a non-limiting example is illustrated, and in which.

Figure 1:
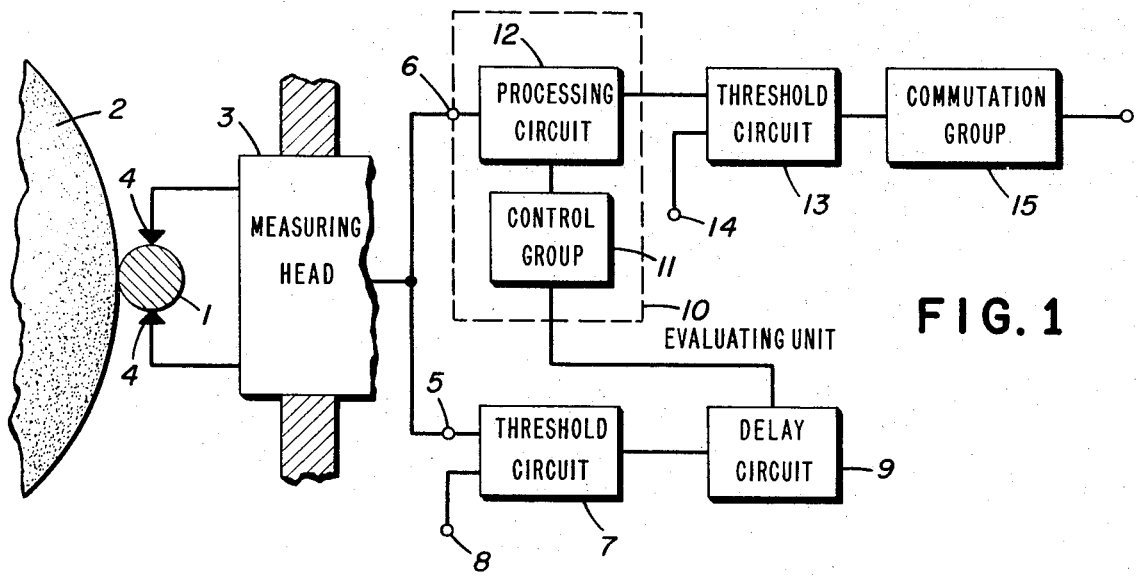
FIG. 1 shows in block form a scheme of a device of the present invention.

With reference to FIG. 1, 1 is a revolving piece to be ground, 2 is a grinding wheel and 3 is a measuring head provided with feelers 4 which are brought into contact with piece 1 and kept there during the machining.

The signal coming from head 3 is brought to terminals 5, 6. Terminal 5 is the input of threshold circuit 7, having another input terminal 8 to which a signal determining the value of the threshold is applied.

The output of the threshold circuit 7 is connected by delay circuit 9 with unit 10, which evaluates the size changes in time of piece 1, thus providing a value for the real stock removal rate.

Unit 10 comprises a control group 11 and a processing circuit 12, controlled by control group 11.

Processing circuit 12 receives the signal applied to terminal 6 and calculates the rate of stock removal.

Unit 10 can be formed by a differentiating circuit of a known type and the control group 11 by a gate circuit or by a timer, of known types, too.

The output of threshold circuit 13 is connected with commutation group 15, which controls the advancing motor of the wheelhead (motor and wheelhead are not represented in the drawing).

Figure 2:
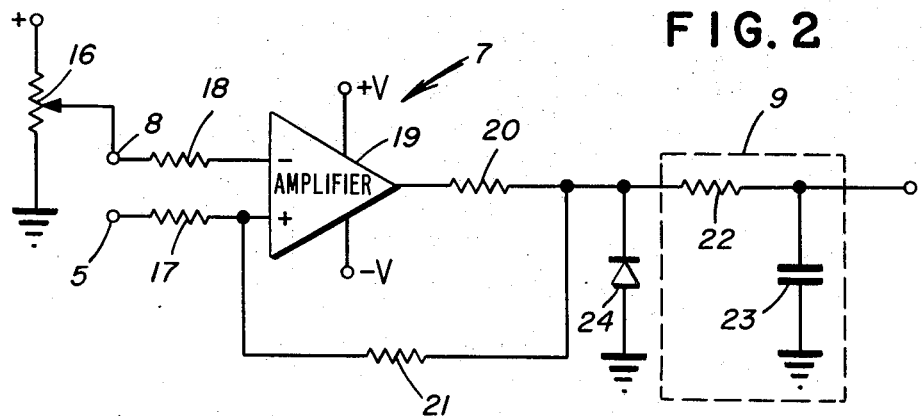
FIG. 2 shows a possible circuit structure of a part of the scheme of FIG. 1.

Threshold circuit 7 and delay circuit 9 can be manufactured, for example, as shown in FIG. 2.

With reference to FIG. 2, terminal 5, on which the signal coming from head 3 of FIG. 1 is applied, and terminal 8, which receives a reference voltage provided by potentiometer 16, are connected by means of resistors, 17, 18, respectively with the positive and the negative input of the operational amplifier 19, fed by voltages +V and −V.

Amplifier 19 has a resistor 20 at the output and is connected in positive feedback by resistor 21.

A terminal of resistor 20 is earth-biased through limiter diode 24 and is connected with resistor 22, which, along with capacitor 23, forms an integrating circuit making up delay circuit 9 of FIG. 1. Threshold circuit 13 can be manufactured substantially in the same way as circuit 7, just described.

As regards commutation group 15, it can be formed, for example, by a circuit controlling a switch inserted in a programmed unit determining the fast approach movement of grinding wheel and the feed movement during stock removal.

Such programmed unit is not described, as it does not fall within the present invention. It can, however, be of any known type.

The device described above works as follows.

At the beginning of the cycle of the machine, the fast approach of grinding wheel 2 and the approach of head 3 to piece 1 are initiated.

The approach speed of head 3 is chosen so that under most unfavorable conditions (i.e., pieces having the highest stock values) head 3 can measure exactly piece 1 before grinding wheel 2 comes into contact with it.

As a matter of fact, after the initial contact of feelers 4 on piece 1 it takes some time for them to settle. During this time they bounce and vibrate on the piece.

The threshold circuit 7 "feels" when head 3 contacts piece 1; then delay circuit 9 provides a delay which guarantees the settling of head 3 so as to trigger unit 10 when the transient following the initial contact of feelers 4 with piece 1 is over.

If unit 10 were put into operation before the end of said transient, because of the oscillations of feelers 4 due to the initial impact, unit 10 would simulate a certain rate of stock removal, thus causing stopping of the fast approach movement before the real contact between grinding wheel 2 and piece 1 takes place.

Therefore threshold circuit 7 commutates when the voltage at terminal 5 exceeds, as for an absolute value, the voltage at terminal 8. After commutation of threshold circuit 7, an interval of time passes, determined by delay circuit 9 (for example, in case of FIG. 2 an interval sufficient in order that capacitor 23 becomes charged at a pre-set level), then delay circuit 9 itself gives a trigger signal to control group 11 of unit 10, which evaluates the speed of stock removal.

When the evaluated speed of stock removal exceeds a pre-set level, threshold circuit 13 releases commutator 15 which controls the end of fast approach movement, and the beginning of feed movement for stock removal.

The main function of threshold circuit 13 is to avoid commutation following mechanical and electrical oscillations which, even if in a very small measure, are always present, and because of which the output signal from unit 10 is not strictly proportional to the real speed of stock removal.

To take these oscillations into consideration, however, a very low threshold is sufficient, which does not influence considerably the promptness of the device.

Therefore the device can commutate speed just after the contact of grinding wheel 2 with piece 1, when grinding wheel has removed a very small part of stock.

Figure 3:
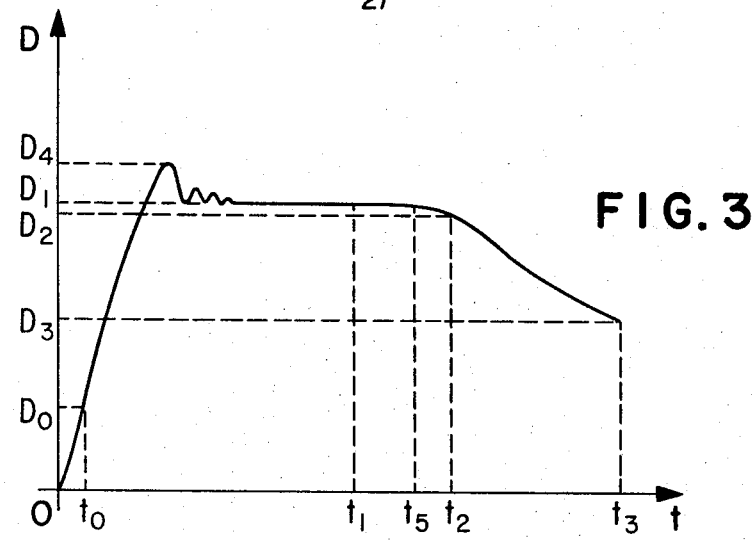
FIG. 3 shows a diagram illustrating the working of the device of FIG. 1.

For a further explanation of what has been said above, the diagram of FIG. 3 should be observed.

Abscissa indicates time $t$, ordinate the signal D coming out of measuring head 3.

To make observation easy, the diagram has not been plotted to scale. At O head 3 begins approaching piece 1 and its electric circuits are operated, so that the pointer of the indicating device on the head is provided with quick moves from position O.

At signal $D_o$ from the head $t_o$ threshold circuit 7 is triggered.

After an interval $t_1 - t_o$ determined by delay circuit 9, delay circuit itself puts unit 10 into operation which calculates the speed of stock removal.

When the latter exceeds a pre-set value (i.e., when the tangent to the curve of FIG. 3 exceeds a pre-set slope, after time $t_1$), circuit 13 releases commutator 15, at the instant $t_2$. If required, threshold circuit 13 can be endowed with filters, to avoid the influence of non-significant signals, due for example to the roughness of piece 1.

Then machining goes on at the programmed feed speed till the instant $t_3$, when the piece reaches nominal size $D_3$. In the same FIG. 3, $D_1$ represents the size of piece 1 before grinding. $D_4$ is the maximum signal given by head 3 after the impact of feelers 4 against piece 1. $D_2$ shows the piece size when the fast approach movement is made to terminate, i.e., when grinding wheel has removed a stock $D_1 - D_2$, in the time $t_2 - t_5$. Obviously, the above-described device can undergo changes and variants equivalent from a functional and structural viewpoint, without falling outside the scope of the present invention.

What is claimed is:

1. A device for controlling the approach speed of the tool towards the pieces to be machined in machine-tools, particularly grinders, comprising gauging means, adapted to provide a signal responsive to the actual size of the workpiece; a processing unit connected with said gauging means and adapted a process said signal responsive to size, for providing a signal responsive to the rate of size change; and a commutating group, operated by said unit, to control, at the time of contact between tool and piece, the passage from approach speed to feed speed.

2. The device according to claim 1, including a threshold circuit placed between said unit and said commutating group.

3. The device according to claim 2, further including a timing means associated with said unit to control its triggering.

4. The device acccording to claim 3, in which said timing means is placed at the output of a second threshold circuit, said second threshold circuit being fed at the input by said gauging means, the signals of the gauging means causing the triggering of said second threshold circuit, said gauging means comprising a gauging head.

5. The device according to claim 4, in which said second threshold circuit is provided with a terminal to which a reference voltage is applied, to control triggering of the circuit itself, on the basis of the signals of said gauging head.

6. The device according to claim 4, in which said timing means is inserted between said second threshold circuit and said unit to put into operation a control group of the unit itself with a pre-set delay with respect to said triggering of the second threshold circuit.

* * * * *